United States Patent
Blessing et al.

(10) Patent No.: US 9,592,690 B2
(45) Date of Patent: Mar. 14, 2017

(54) PRINT HEAD, UPGRADE KIT FOR A CONVENTIONAL INKJET PRINTER, PRINTER AND METHOD FOR PRINTING OPTICAL STRUCTURES

(71) Applicant: LUXEXCEL HOLDING BV., Wolphaartsdijk (NL)

(72) Inventors: Kurt Blessing, Ludenscheid (DE); Richard van de Vrie, Wolphaartsdijk (NL)

(73) Assignee: LUXEXCEL HOLDING B.V., Kruiningen (NL)

(*) Notice: Subject to any disclaimer, the term of this patent is extended or adjusted under 35 U.S.C. 154(b) by 845 days.

(21) Appl. No.: 13/924,974

(22) Filed: Jun. 24, 2013

(65) Prior Publication Data
US 2013/0286073 A1    Oct. 31, 2013

Related U.S. Application Data

(63) Continuation of application No. PCT/EP2012/000025, filed on Jan. 4, 2012.

(30) Foreign Application Priority Data

Jan. 6, 2011 (EP) .................................. 11000072

(51) Int. Cl.
  *B41J 29/393* (2006.01)
  *B29D 11/00* (2006.01)
  (Continued)

(52) U.S. Cl.
  CPC .............. *B41J 29/393* (2013.01); *B29D 11/00* (2013.01); *B29D 11/00951* (2013.01); *B41J 2/2132* (2013.01); *G02B 5/0221* (2013.01)

(58) Field of Classification Search
  CPC . B41J 29/393; B41J 2/2132; B29D 11/00951; B29D 11/00; G02B 5/0221
  (Continued)

(56) References Cited

U.S. PATENT DOCUMENTS 3,679,291 A    7/1972    Apfel et al.
3,990,784 A   11/1976    Gelber
(Continued)

FOREIGN PATENT DOCUMENTS

DE        10060304 A1    4/2000
DE    102005/039113 A1   3/2005
(Continued)

OTHER PUBLICATIONS

Japanese Office Action for Application No. 2013-547840 dated Oct. 23, 2015.
(Continued)

*Primary Examiner* — Alison L Hindenlang
*Assistant Examiner* — Emmanuel S Luk
(74) *Attorney, Agent, or Firm* — The Dobrusin Law Firm, P.C.

(57) ABSTRACT

The invention relates to a print head for printing optical structures on a substrate comprising an ejection device for ejecting at least one droplet of a printing ink towards the substrate in order to build up the optical structure, wherein the print head comprises a measurement means for contactless measuring at least one physical parameter of the at least one deposited droplet.

16 Claims, 2 Drawing Sheets

(51) Int. Cl.
*B41J 2/21* (2006.01)
*G02B 5/02* (2006.01)

(58) Field of Classification Search
USPC .......................................................... 425/375
See application file for complete search history.

(56) References Cited

U.S. PATENT DOCUMENTS

| | | |
|---|---|---|
| 4,673,609 A | 6/1987 | Hill |
| 5,655,339 A | 8/1997 | DeBlock et al. |
| 5,707,684 A | 1/1998 | Hayes et al. |
| 5,929,875 A * | 7/1999 | Su ..................... B41J 2/04505 347/19 |
| 5,943,075 A * | 8/1999 | Lee ....................... B01L 3/0268 239/102.2 |
| 6,364,459 B1 | 4/2002 | Sharma et al. |
| 6,805,902 B1 | 10/2004 | Hayes |
| 6,833,960 B1 | 12/2004 | Scarbrough et al. |
| 6,856,462 B1 | 2/2005 | Scarbrough et al. |
| 7,038,745 B2 | 5/2006 | Weber et al. |
| 7,393,095 B2 | 7/2008 | Oshima et al. |
| 7,609,451 B1 | 10/2009 | Scarbrough |
| 2002/0089561 A1* | 7/2002 | Weitzel ................... B41J 2/125 347/19 |
| 2002/0171177 A1 | 11/2002 | Kritchman et al. |
| 2003/0061775 A1 | 4/2003 | Rille |
| 2003/0079422 A1 | 5/2003 | Bracale |
| 2004/0036856 A1* | 2/2004 | Wittman .................. B41J 2/195 356/73 |
| 2004/0223100 A1 | 11/2004 | Kotchick et al. |
| 2004/0231594 A1 | 11/2004 | Edwards et al. |
| 2004/0233265 A1 | 11/2004 | Kojima et al. |
| 2005/0030331 A1 | 2/2005 | Komatsu et al. |
| 2005/0059766 A1 | 3/2005 | Jones |
| 2006/0079036 A1 | 4/2006 | Su et al. |
| 2006/0279036 A1 | 12/2006 | Hasei et al. |
| 2006/0279945 A1 | 12/2006 | Hasei et al. |
| 2007/0126074 A1 | 6/2007 | Chuang et al. |
| 2007/0229950 A1 | 10/2007 | Ouderkirk et al. |
| 2008/0049088 A1 | 2/2008 | Codos |
| 2008/0074887 A1 | 3/2008 | Nakata et al. |
| 2008/0094440 A1* | 4/2008 | Kamiyama ............ G02B 5/201 347/19 |
| 2008/0231649 A1* | 9/2008 | Kawabata ............ B41J 2/17509 347/14 |
| 2009/0016757 A1 | 1/2009 | Priebe et al. |
| 2009/0079782 A1* | 3/2009 | Sasayama ............... B41J 29/393 347/19 |
| 2009/0220708 A1 | 9/2009 | Schmitt |
| 2009/0244230 A1 | 10/2009 | Ohnishi et al. |
| 2009/0267269 A1 | 10/2009 | Lim |
| 2010/0007962 A1 | 1/2010 | Hughes |
| 2010/0208006 A1 | 8/2010 | Selinfreund |
| 2011/0298877 A1 | 12/2011 | Blessing |
| 2012/0019936 A1 | 1/2012 | Blessing |
| 2013/0133274 A1 | 5/2013 | Blessing |
| 2015/0021815 A1* | 1/2015 | Albrecht ................ B05B 5/001 264/235 |
| 2015/0093544 A1* | 4/2015 | Van De Vrie ....... B29C 67/0059 428/156 |

FOREIGN PATENT DOCUMENTS

| | | |
|---|---|---|
| DE | 102006/003310 A1 | 2/2009 |
| EP | 1225472 | 1/2002 |
| EP | 1225472 A2 | 7/2002 |
| EP | 1240878 A1 | 9/2002 |
| EP | 1614544 | 4/2004 |
| EP | 1637926 A2 | 3/2006 |
| EP | 2412767 A1 | 2/2012 |
| EP | 2396682 B1 | 5/2013 |
| FR | 10-01854 | 2/1952 |
| FR | 10-02340 A1 | 3/1952 |
| GB | 2350321 A1 | 11/2000 |
| JP | 2000-313067 | 11/2000 |
| JP | 2002-273868 | 9/2002 |
| JP | 2004-330495 | 11/2004 |
| JP | 2006/343449 A | 12/2006 |
| JP | 2008/286973 A | 11/2008 |
| JP | 2008-545998 | 12/2008 |
| JP | 2009-083326 | 4/2009 |
| JP | 2009/292091 A | 12/2009 |
| JP | 2010-030310 | 2/2010 |
| WO | 97/48557 A1 | 12/1997 |
| WO | 98/20392 A1 | 5/1998 |
| WO | 99/11735 A1 | 3/1999 |
| WO | 2004/096527 A1 | 11/2004 |
| WO | 2005/113219 A1 | 1/2005 |
| WO | 2006/029268 | 3/2006 |
| WO | 2006122564 | 11/2006 |
| WO | 2006/135776 A1 | 12/2006 |
| WO | 2008/029128 A2 | 3/2008 |
| WO | 2009041707 | 4/2009 |
| WO | 2009/147353 A2 | 12/2009 |
| WO | 2010/091888 | 8/2010 |
| WO | 2011/120681 | 10/2011 |

OTHER PUBLICATIONS

International Search Report dated Mar. 26, 2012, Application No. PCT/EP2012/000025, filed Jan. 4, 2012.
Co-Pending U.S. Appl. No. 13/153,683, filed Jun. 6, 2011, Published as US2011/0298877 dated Dec. 8, 2011.
Co-Pending U.S. Appl. No. 13/201,255, filed Oct. 6, 2011, Published as US2012/0019936 dated Jan. 26, 2012.
Potentially related application, U.S. Appl. No. 13/637,455, published as 2013/0133274, publication date May 30, 2013.
Cox, W.R. et al., "Microjet Printing of Anamorphoc Microlens Arrays," SPIE vol. 2687, pp. 89-98.
Chen, Chin-Tai, et al., "Dynamic evolvement and formation of refractive microlenses self-assembled from evaporative polyurethane droplets," Sensors and Actuators A 147 (2008) p. 369-377.

* cited by examiner

PRINT HEAD, UPGRADE KIT FOR A CONVENTIONAL INKJET PRINTER, PRINTER AND METHOD FOR PRINTING OPTICAL STRUCTURES

CLAIM OF PRIORITY

This application is a continuation application of and claims priority to PCT Application Serial Number PCT/EP2012/000025 filed on Jan. 4, 2012, which (along with this application) claims priority to EP 11000072.6 filed on Jan. 6, 2011, both of the foregoing applications being incorporated herein by reference.

BACKGROUND

The present invention relates to a print head for printing optical structures on a substrate comprising an ejection device for ejecting at least one droplet of a printing ink towards the substrate in order to build up the optical structure.

It is common knowledge that products provided with optical structures can be manufactured in a comparably time-saving and inexpensive way by printing the optical structures directly on an appropriate substrate. Suchlike imprinted optical structures comprise lenses, mirrors or retroreflectors, for instance. The substrate can be made of synthetic material or glass. Furthermore, it is well known to cure the imprinted material by using light irradiation for reducing the overall printing time.

For example, PCT patent application WO 2010/091 888 A1 discloses a method for producing optical lenses from a moldable transparent material by depositing the material on a substrate in a layer that is subsequently cured by a laser or by UV irradiation. The transparent material is deposited on the substrate by a conventional printing-on-demand printer, for instance.

In order to provide high quality optical structures with certain optical effects, the three dimensional geometries and the surface contours of the optical structures have to be precisely designed according to a given pattern. Even the slightest deviation in the intended geometry of the optical structures results in significant optical errors. Consequently, the droplets have to be positioned onto the substrate with high accuracy and curing has to be performed depending on the present flow behavior of the printing ink.

This is very difficult because the behavior of the Just at the moment deposited and still uncured droplets strongly depends on many factors, like material and surface conditions of the substrate, composition of the printing ink, atmospheric pressure, temperature, air moisture, orientation between the printer and the gravitational field and the like. Disadvantageously, it is not possible to take into account all of these factors previously.

SUMMARY

An object of the present invention is to provide a print head, an upgrade kit for a conventional inkjet printer, an inkjet printer and a method for printing optical structures providing the printing of reproducible high quality optical structures.

The object of the present invention is achieved by a print head for printing optical structures on a substrate comprising an ejection device for ejecting at least one droplet of printing ink towards the substrate in order to build up the optical structure, wherein the print head comprises a measurement means for contactless measuring at least a physical parameter of the at least one deposited droplet.

According to the present invention, it is thereby advantageously possible to provide a print head which enables the verification of the imprinted droplets and/or of the formed optical structure by measuring the at least one physical parameter. Consequently, a feedback is generated in time by the print head which is based on the actual and real physical conditions of the deposited droplets. Potential deviations e.g. from the desired geometry are being identified by the print head in real-time and if necessary can be rectified in further printing and/or curing steps. In this way, all potential environmental disturbances are automatically taken into account. Furthermore, a real-time control of the printing process is possible which reduces the number of rejections and the involved costs. Preferably, the contactless measurement is accomplished before, during and/or shortly after depositing a further droplet of printing ink. In particular, the print head is configured for ejecting further droplets of printing ink in dependence upon the recently measured physical parameters, so that the detected deviation from the desired geometry can be compensated.

Preferably, geometric parameters, like the thickness and/or the surface conditions of the at least one deposited droplet and/or of the layer of multiple deposited droplets are determined, wherein particularly preferably those geometric parameters of the at least one deposited droplets are measured which directly influences the optical characteristics of the optical structure. Preferably, also optical characteristics, like the grade of transmission, the grade of reflection and/or the coloring of the deposited droplet and/or the layer of multiple deposited droplets are determined. It is conceivable that not only geometric and/or optical parameters of the at least one deposited droplet is measured, but also geometric and/or optical parameters of a subsection or of the whole optical structure is measured by the measurement means in order to evaluate the overall design. Preferably, the measurement means are provided near the ejection device on a moving part of the printing head. Optical structures in the sense of the present invention in particular comprise micro lenses, Fresnel structures, optical prisms and the like, which are made of multiple droplets of printing ink deposited by the printing head. The printing ink preferably comprises a transparent material. In order to build up the optical structure, the droplets have to be arranged side by side and one above the other, preferably partly overlapping each other, so that the optical structure mainly forms a 3D-structure which optically influences light passing the optical structure and/or the substrate.

According to a preferred embodiment of the present invention, the measurement means is configured for layer thickness measurements and/or for distance measurements. Preferably, the measurement means are provided for determining the distance between the measurement means and the at least one deposited droplet. This method allows a comparatively simple method of determining the geometric parameters, like thickness and/or surface contour of the imprinted printing ink. It is conceivable that the measurement means performs reference measurements in between. In the reference measurements the measurement means measures the distance between the substrate and the measurement means, so that the thickness of the layer of deposited droplets can simply be calculated from the mathematical difference between the measured distance between the substrate and the measurement means (reference measurement) and the distance between the surface of the layer of deposited droplets and the measurement means. Preferably, the distance is measured from at least two different locations at the print head in order to increase accuracy. The optical characteristics, like grade of transmission, grade of reflection and/or coloring are determined e.g. by comparing the spectrum of the light projected towards the deposited droplets with the spectrum of the reflected light. Alternatively, the luminous power of the reflected light is compared to the luminous power of the light radiated by the light source.

Preferably, the measurement means is configured for triangulation measurements. The wording triangulation measurements in the sense of the present invention principally comprises a process of determining the location of a point by measuring angles to it from known points (at the print head) at either ends of a fixed baseline, rather than measuring the distance to the point directly. Particularly, the print head is configured for performing LASER-triangulation which is a comparatively precise and reliable method for determining geometry parameters. But also other contactless measurement methods e.g. based on ultrasonic waves or other light source can be used for distance measurements and especially for triangulation measurements in the sense of the present invention. For using LASER-triangulation measurements, the measurement means comprises at least one LASER source for projecting a laser spot onto the at least one deposited droplet and at least one receiving means, preferably a CCD- (Charge Coupled Device) camera for receiving the laser light of the at least one LASER source after reflection at the deposited droplet. Furthermore, an evaluation unit is provided for calculating the geometric parameter from the position of the laser spot on the deposited droplet and from the known distance between the LASER source and the receiving means at the print head (in particular the baseline is parallel to the substrate). In this manner, the angle between the light beam sent out by the LASER and the reflected corresponding light beam received by the CCD-camera is measured. From this the distance to the surface of the deposited droplet and in particular the thickness of the layer of printing ink on the substrate can be calculated.

According to another preferred embodiment, the measurement means is configured for optical interference measurements. The measurement means comprises e.g. an interferometer which is capable of performing precision measurements of the thickness and/or the surface contour of the layer of deposited droplets by using interferometry. According to this technique, two or more light waves are analyzed by their superposition, so that slight phase shifts in the light waves can be detected. Conceivable, a light wave reflected by the surface of the layer of deposited droplets is superposed with a reference light wave in order to determine the thickness of the layer, for instance.

According to another preferred embodiment of the present invention, the print head comprises a curing device for curing the at least one deposited droplet, wherein preferably the curing device comprises at least one UV-LED (ultraviolet emitting light-emitting diode).

In order to build up the optical structure, the droplets have to be arranged side by side and one above the other, preferably partly overlapping each other, so that the optical structure mainly forms a 3D-structure which optically influences light passing the optical structure and/or the substrate. Consequently, a new droplet deposited on the 3D structures has timely to be cured to avoid that the new deposited droplet flows off the 3D structure. This aim can be achieved by using the UV LED as the curing device, because on the one hand the switching times of UV LED's are comparably short and on the other hand UV LED's provide high radiation power. The curing device is particularly configured for curing the at least one deposited droplet and/or the optical structure depending on the measured geometric and/or optical parameters. For example, if a desired shape of the optical structure is obtained, the curing device is enabled for final hardening the optical structure. Alternatively, if the measurements show that the shape of the optical structure has to be revised, the deposited droplets get only partially hardened, so that further droplets can be deposited merging with the partially hardened droplets in order to achieve the desired geometry.

Particularly, the print head is movable relative to the substrate, wherein the print head is movable in parallel to a plane of the substrate to deposit droplets of the printing ink at a certain position on the substrate and/or wherein the print head is rotatable relatively to the substrate to adjust the ejection direction of the droplets. It is herewith advantageously possible that the position of the print head relatively to the substrate and therefore also the positions of the deposited droplets relatively to the substrate are software-controlled. Preferably, the ejection device is rotatable supported around a pivot axle extending perpendicular to the conveying direction and parallel to the plane of the substrate, wherein preferably the print head comprises a stepper motor swiveling the ejection device about the pivot axle. It is herewith advantageously possible to adjust the position of the deposited droplet on the substrate relatively to the conveying direction. Thus, multiple droplets can be deposited on the same position of the substrate one above the other, while the substrate continually moves along the conveying direction. Preferably, the movement and in particular the rotation of the ejection is performed depending on the measured geometric and/or optical parameters. It is herewith advantageously possible that inaccuracies in the shape of the optical structure can be corrected by correspondingly adjusting the ejection direction and ejecting further droplets onto the still incorrect optical structure. Another advantage of this approach is that by adjusting the ejection direction the shape of the deposited droplet on the substrate can be influenced, as the symmetry or asymmetry of the deposited droplet depends on the angle between the ejection direction and the plane of the substrate.

According to another preferred embodiment of the present invention, it is preferred that the curing device comprises at least two UV-LED's emitting light of different wavelength ranges, wherein the at least two UV-LED's are controlled depending on the measured geometric and/or optical parameters. It is herewith advantageously possible that one of the two UV-LED's is provided for only partially hardening the deposited droplet, wherein the other of the two UV-LED's is provided for final hardening of the optical structure not until the measurements show that the geometry and/or optic of the optical structure is sufficiently accurate. Furthermore, the curing status of the deposited droplets can be determined by the measurement means, so that a further curing step is performed when the measurements show that the printing ink is so far not completely hardened. By this means, the overall curing time can be optimized. The at least two UV-LED's are provided in such a manner that the light cones emitted by each of the at least two UV-LED's overlap each other in the area of the at least one deposited droplet. Thereby, it is advantageously possible to increase the energy deposition in the area of the deposit printing ink to be cured and consequently to decrease the overall curing time.

Preferably, a first UV-LED of the at least two UV-LED's is capable of emitting ultraviolet light of a first wavelength range and a second UV-LED of the at least two UV-LED's is capable of emitting ultraviolet light of a second wavelength range, wherein the second wavelength range differs at least partially from the first wavelength. Preferably, the print head comprises at least a first and a second ejection device, wherein the first ejection device is capable of ejecting at least one droplet of a first printing ink and wherein the second ejection device is capable of ejecting at least one droplet of a second printing ink, wherein the first printing ink is curable by ultraviolet light of the first wavelength range and wherein the second printing ink is curable by ultraviolet light of the second wavelength range. It is hereby advantageously possible to cure different deposited droplets at different times which enable fast printing of comparatively complex optical structures and to efficiently rectify incorrect optical structures in dependence of the measurements of the geometric and optical parameters. It is even conceivable that the second printing ink differs from the first printing ink in at least one physical parameter, wherein the physical parameters preferably comprises curing time, curing temperature, curing wavelength, viscosity, transmittance and/or optical transparency. It is herewith advantageously possible to print certain portions of the optical structures providing certain optical effects compared to other portions of the optical structures, e.g. by printing the certain portions with printing ink which provides a certain optical transparency.

Another object of the present invention is an upgrade kit for a conventional inkjet printer for printing optical structures on a substrate comprising a print head in accordance with the present invention. Thereby, it is advantageously possible that the print head according to the present invention can be applied in a conventional inkjet printer in order to upgrade the inkjet printer for optic printing applications. For example, upgrading the conventional inkjet printer comprises a step of removing the conventional inkjet printer head of the conventional inkjet printer and replacing it with the print head according to the claims and description herein. In addition, the firmware and/or the software drivers of the inkjet printer are preferably updated in a further step.

Another object of the present invention is a printer, preferably an inkjet printer, comprising a print head in accordance with the present invention.

Another object of the present invention is a method for printing optical structures on a substrate by using a print head, in particular according to the present invention, comprising steps of providing the substrate and ejecting at least one droplet of a printing ink towards the substrate in order to build up the optical structure, wherein a further step of contactless measuring at least a physical parameter of the at least one deposited droplet is performed.

It is herewith advantageously possible that the physical conditions, in particular the geometric and/or optical conditions, of the imprinted droplets or of a layer of multiple imprinted droplets are verified during the printing procedure, preferably in real-time. In this way, a correction of the surface of the optical structure can be performed in further printing steps when deviations from the desired shape are measured, for instance.

According to a preferred embodiment of the present invention, the at least one physical parameter is measured in real-time measurements. That means that measuring the at least one physical parameter is performed before and/or during a further droplet of printing ink is deposited. Preferably, the deposition of the further droplet is performed depending on the measured physical parameter in order to achieve a desired accurate and verified shape of the printed optical structure.

Preferably, the distance between the measurement means and the at least one deposited droplet is determined in the further step. The geometric parameter comprises e.g. thickness and/or surface contour of the deposited droplet. According to a preferred embodiment, also optical parameters, like grade of transmission, grade of reflection and/or coloring of the at least one deposited droplet and/or the optical structure are evaluated in the further step. In particular, the following printing steps are optimized depending on the geometric and/or optical parameters in order to achieve a desired accurate shape of the printed optical structure. Preferably, further steps of depositing droplets of printing ink on the substrate are performed depending on the measured geometric and optical parameters. For example, the printing time, the kind of printing ink, the ejection direction of the droplet, the position of the deposited droplet on the substrate, the quantity of ejected printing ink, the sizes of the droplets, the number of further droplets are determined depending on the measured geometric and optical parameters. It is also calculated where on the substrate further droplets have to be deposited and how much printing ink has to be deposited in order to optimize the shape of the optical structure, for instance. Furthermore, e.g. the required printing speed, curing time and/or orientation of the printing head is determined. It is conceivable that also the kind of printing ink is selected if different printing inks would be available. In particular, the steps of depositing droplets of printing ink and measuring the geometric and optical conditions are repeated iteratively until a satisfactory optical structure is achieved. Preferably, the at least one deposited droplet is cured by using ultraviolet light emitted from at least one UV-LED, wherein the steps of ejecting the at least one droplet, measuring the geometric and optical conditions and curing the at least one deposited droplet are repeated one or more times in order to generate an optimized optical structure.

According to another embodiment of the present invention, it is preferred that triangulation measurements are performed to measure the geometric and/or optical parameters of the at least one deposited droplet and/or of the optical structure. Preferably, LASER-triangulation measurements are performed in the further step, wherein a laser spot is projected onto the at least one deposited droplet by LASER source of the printing head and laser light reflected by the at least one deposited droplet is received by receiving means, preferably a CCD-camera, of the printing head. For this purpose, the geometric parameter is calculated from the position of the laser spot on the at least one deposited droplet and the known distance between the LASER source and the receiving means at the print head. It is herewith advantageously possible to provide a comparatively exact and reliable control of the printing procedure.

According to another preferred embodiment of the present invention, the method comprises a step of moving and preferably rotating the print head to a certain position relatively to the substrate depending on the measured geometric and optical conditions before ejecting a further droplet. It is herewith advantageously possible to adjust the position of the deposited droplet on the substrate. Thus, multiple droplets can be deposited on the same position of the substrate one above the other, while the substrate continually moves along the conveying direction. Furthermore, inaccuracies in the shape of the optical structure can be corrected by correspondingly adjusting the ejection direction and ejecting further droplets onto the optical structure. Another advantage of this approach is that by adjusting the ejection direction the shape of the deposited droplet on the substrate can be influenced, as the symmetry or asymmetry of the deposited droplet depends on the angle between the ejection direction and the plane of the substrate.

Preferably, the steps of moving the print head, ejecting the at least one droplet and curing the at least one deposited droplet are repeated one or more times in order to generate the optical structure. In a preferred embodiment the print head contains a plurality of different ejecting devices, wherein each ejecting device ejects different and/or equal printing inks and wherein the ejection of the ejecting devices occurs simultaneously and/or subsequently.

According to another embodiment of the present invention, it is preferred that the method comprises a step of printing a visible picture onto the substrate by the print head, preferably before, during or after the optical structure is printed onto the substrate. The printed picture comprises, in particular, a motif, specified optical effects being generated by the optical structure when the motif is observed. In particular, the optical structure is adjusted to the motif in such a way that only the optical appearance of partial areas of the motif is correspondingly modified by the optical structure. The motif can be produced by means of transparent or non-transparent printing ink according to choice. The picture represents, for example, the picture of a landscape, an object, a photo, a lettering or similar. Logos or alphanumeric symbols, which can be used for advertising or information purposes, are also possible as motifs. These symbols can be made detectable either by the optical structure or by corresponding colouring. A light-directing and glare-reducing device can be especially advantageously implemented so that the lower light-directing elements direct incident light strongly upward in a bundled form, whereas the upper light-directing elements direct incident light into the depth of the room in a flatly bundled form, so that an even distribution of scattered light in the room is generated. Targeted projection of a coloured logo, symbol or writing is also possible. This formation can then be provided, for example, on a corresponding window pane or similar. According to a preferred embodiment of the present invention, it is provided that the substrate comprising the imprinted optical structure and/or the imprinted picture comprises a billboard, a poster, a decorative surface, a cladding element, a facade cladding, a brochure or periodical page, a cover sheet, a picture, a packaging (e.g. a food packaging), a label, a house number, a window image, a screen, a lampshade, a diffusing screen, an adhesive label, a plate, a computer screen and/or similar.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

Figure 1:
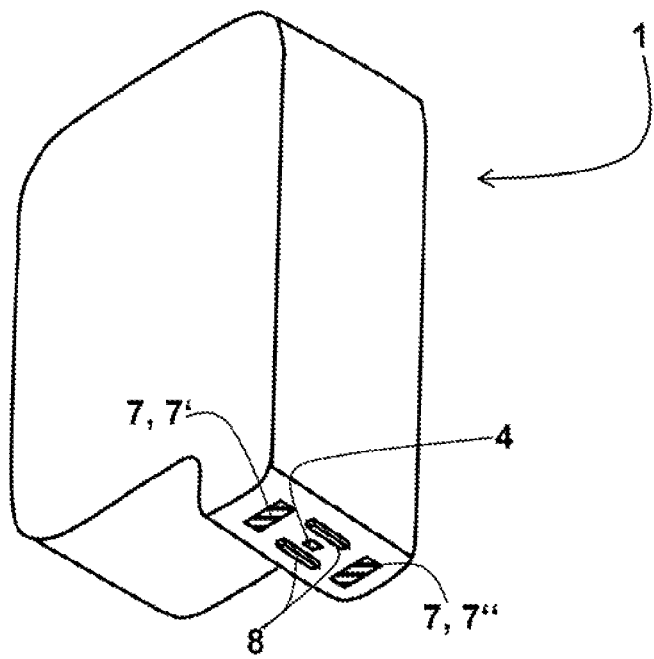
FIGS. 1 and 2 schematically show a print head according to an exemplary first embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

Figure 2:
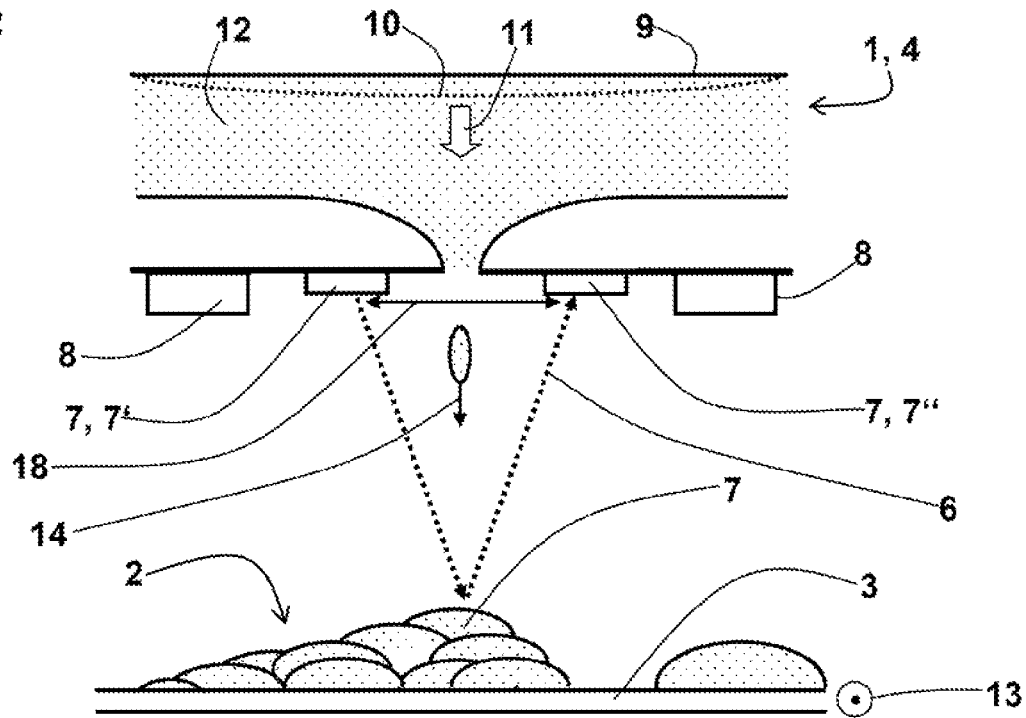

FIGS. 1 and 2 schematically show an example a print head 1 according to an exemplary first embodiment of the present invention.

FIG. 1 illustrates a print head 1 having an ejecting device 4, measuring means 7 and a curing device 8 at its bottom side. The ejecting device 4 comprises an ejecting nozzle for ejecting droplets of a liquid polymer-based printing ink provided in an inner chamber 12 of the print head 1 (not shown in FIG. 1). The ejecting device 4 is applicable for ejecting the droplets onto a substrate 3 (not shown in FIG. 1) in order to build up an optical structure 2 like optical lenses, optical prism and/or Fresnel structures on the substrate 3. The substrate 3 is preferably made of a transparent synthetic film material or a glass plane, wherein the printing ink is transparent ink curable by ultraviolet light. The measuring means 7 is provided for contactless measuring geometric and optical parameters of the deposited droplet 5 or the optical structure 2 build up by the deposited droplets 5. LASER triangulation measurements are used as measuring technique. For this purpose, the measurement means 7 comprise a LASER source 7' and a CCD camera 7" spaced apart from each other. The nozzle is located between the LASER source 7' and the CCD camera 7". The LASER source 7' is provided for projecting laser light towards the deposited droplet 5 which is reflected by the surface of the deposited droplets 5 towards the CCD camera 7". The CCD camera 7" measures the position and in particular the incidence angle of the reflected laser light. The light path 6 of the laser light is schematically illustrated in FIG. 2 as a dotted line. The distance between the print head 1 and the surface of the deposited droplet 5 is calculated subsequently from the measured incidence angle of the reflected laser light and the known fixed distance (illustrated as baseline 18 in FIG. 2) between the LASER source 7' and the CCD camera 7" on the bottom of the print head 1. The three dimensional surface contour of the deposited droplets 5 and the optical structure 2 can be determined by performing multiple triangulation measurements in different positions of the printing head 1 or under diverse angles. Subsequent printing steps are performed depending on the determined surface contour in order to build up a certain optical structure 2.

The curing device 8 comprises two UV-LED's (ultraviolet emitting light-emitting diode) for curing the deposited droplet 5, wherein the nozzle is located between these two UV-LED's. The steps of depositing droplets of printing ink, at least partially curing the deposited droplet 5 and measuring the surface contour of the optical structure 2 build up by multiple deposited droplets 5 are repeated iteratively until a desired shape of an optical structure 2 is achieved. Afterwards, a step of finally curing the optical structure 2 is accomplished. The print head 1 fits into a conventional inkjet printer (not shown in FIG. 1), so that a conventional inkjet printer can be upgraded for printing optical structures 2 simply by replacing the conventional print head by the print head 1 according to the present invention. Preferably, the print head 1 shown in FIG. 1 is a part of an inkjet printer and/or is a part of an upgrade kit for a conventional inkjet printer.

FIG. 2 shows a cross-sectional view of the print head 1 illustrated in FIG. 1. The print head 1 uses a piezoelectric material 9 in the ink-filled chamber 12 behind the nozzle of the ejecting device 4. When a voltage is applied to the piezoelectric material 9, the piezoelectric material 9 changes its shape (see doted curve 10), which generate a pressure pulse 11 in the liquid printing ink in the chamber 12 forcing a droplet of the printing ink 4 from the nozzle towards the substrate 3 along the ejection direction 14 (the ejection direction 14 is directed perpendicular to the plane of the substrate 3 in the present example), in the present example, the droplet is deposited onto other previously printed droplets 5 in order to build up the optical structure 2. Subsequently, the UV-LED's are enabled, so that the deposited droplet 5 is at least partially cured due to irradiation with ultraviolet light from the UV-LED's. The light cones of the UV-LED's overlaps each other substantially only in the area of the droplet 5 which has to be cured. Afterwards, the surface contour of the deposited droplets 5 and of the optical structure 2 is measured by the measurement means 7 using LASER triangular measurements. The measured geometric or optical parameters, in particular data on the surface contour are compared software-controlled to the desired shape of the optical structure 2 which has to be build up. Depending on the differences between the actual surface contour and the desired theoretical surface contour, further droplets of printing ink are ejected towards the substrate 3 in order to gradually approximate the actual shape of the surface contour to the desired shape. The steps of depositing droplets of printing ink, partially curing the deposited droplets and measuring the geometric characteristics are repeated iteratively until a satisfactory optical structure 2 is achieved. In this process, the printing parameters like printing time, kind of printing ink, ejection direction of the droplet, position of the deposited droplet 5 relatively to the substrate 3, quantity of ejected printing ink, size of the ejected droplet, total number of further droplets and/or the like are adjusted in dependency of the measured geometric and/or optical parameters in each iterative loop, if the desired shape is achieved, a final curing step with increased curing power is accomplished for finally hardening the whole optical structure 2. As exemplary shown in FIG. 2, the optical structure 2 comprises an optical prism in the present example.

During the printing procedure, the substrate 3 moves along a conveying direction 13 through the printer. It is conceivable that furthermore a picture, like a motif, lettering, logo or the like, is printed onto the substrate 3 by the same print head 1, wherein the printing of the picture is performed before, during or after printing the optical structure 2. The step of printing the picture is accomplished by depositing conventional colored printing ink onto the substrate 3, wherein the printing head 1 comprises an additional printing ink tank (not shown in FIG. 2) storing the conventional colored printing ink and an additional ejection device (not shown in FIG. 2) for ejecting the conventional colored printing ink from the additional printing ink tank to the substrate 3.

Figure 3:
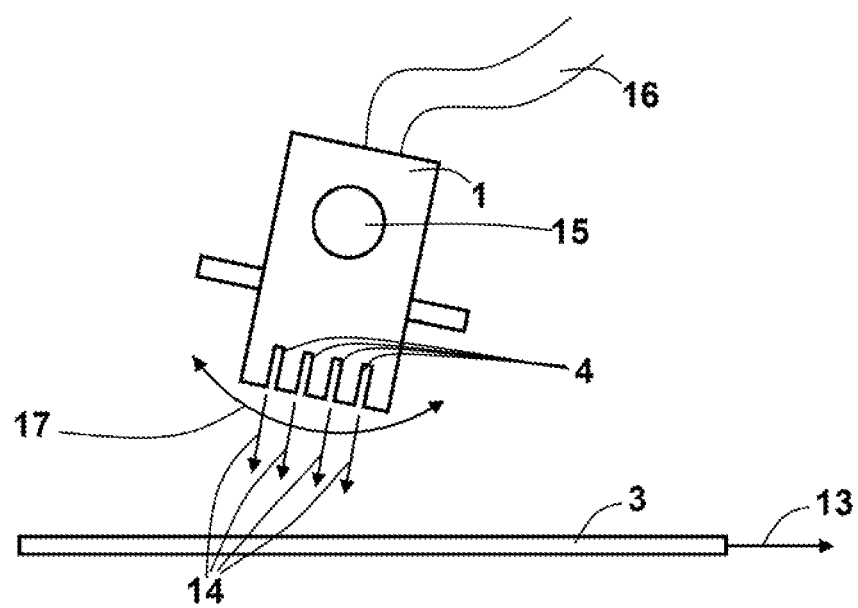
FIG. 3 schematically shows a print head according to an exemplary second embodiment.

FIG. 3 schematically shows a print head 1 according to an exemplary second embodiment of the present invention. The second embodiment is substantially similar to the first embodiment illustrated in FIGS. 1 and 2, wherein the print head 1 is provided rotatable about a pivot axle 15 along a swivelling direction 17. The pivot axle 15 extends perpendicular to the conveying direction 13 of the substrate 3 and parallel to the plane of the substrate 3. Therefore, the illustrated four ejection devices 4 are rotatable in such a manner that the ejection directions 14 of the ejected droplets are movable relatively to the conveying direction 13 of the substrate 3. Preferably the print head 1 comprises a stepper motor (not shown in FIG. 3) swiveling the print head 1 together with the ejection devices 4 about the pivot axle 15 in order to adjust the position and the shape of the deposited droplets 5 relatively to the substrate 3 along the conveying direction 13 depending on the measured geometric and/or optical parameters of the deposited droplets 5. Thus, multiple droplets can be deposited on the same position of the substrate 3 and inaccuracies in the shape of the optical structure 2 measured by the measuring means 7 can be corrected even if the substrate 3 keep on moving along the conveying direction 13 with constant velocity. The print head 1 comprise a data cable 16 for connecting the print head 1 with an external computer (not shown).

LIST OF REFERENCE NUMERALS 1 print head
2 optical structure
3 substrate
4 ejection device
5 deposited droplet
6 light path
7 measurement means
7' LASER source
7" CCD camera
8 curing device
9 piezoelectric material
10 doted curve
11 pressure pulse
12 chamber
13 conveying direction
14 ejection direction
15 pivot axle
16 data cable
17 swivelling direction
18 baseline

The invention claimed is:
1. A print head for printing optical structures on a substrate comprising an ejection device for ejecting at least one droplet of printing ink towards the substrate in order to build up the optical structure,
wherein the print head comprises a measurement means for contactless measuring at least one physical parameter of the at least one deposited droplet,
wherein the measurement means is configured for measuring at least one geometric parameter of the at least one deposited droplet,
wherein the measurement means is configured for ultrasonic measurements, optical interference measurements and/or optical triangulation measurements of the at least one deposited droplet, and
wherein the measurement means is configured for real-time measurements of the at least one physical parameter and for distance measurements, and wherein the print head is configured for ejecting further droplets of printing ink in dependence upon the measured at least one physical parameter with the at least one geometric parameter.

2. The print head according to claim 1, wherein the measurement means is configured for measuring the at least one physical parameter before, during and/or after depositing a further droplet of printing ink.

3. The print head according to claim 1, wherein the at least one geometric parameter comprises thickness and/or surface contour of a layer of deposited droplets.

4. The print head according to claim 1, where the measurement means is configured:
   a. for determining an optical parameter of the at least one deposited droplets, wherein the optical parameter comprises grade of transmission, grade of reflection and/or coloring of a layer of deposited droplet;
   b. for layer thickness measurements; and/or
   c. for LASER (Light Amplification by Stimulated Emission of Radiation) triangulation measurements.

5. The print head according to claim 4, wherein the measurement means comprises:
   a. at least one LASER source for projecting a laser spot onto at least one deposited droplet and at least one receiving means, including a CCD- (Charge Coupled Device) camera, for receiving a laser light of the at least one LASER source reflected by the at least one deposited droplet; and/or
   b. an evaluation unit for calculating the at least one geometric parameter of the at least one deposited droplet from a position of the laser spot on the at least one deposited droplet and from a known distance between the LASER source and the receiving means.

6. The print head according to claim 1, wherein the print head:
   comprises a curing device for curing the at least one deposited droplet, wherein the curing device comprises at least one UV-LED (Ultraviolet Light Emitting Diode).

7. The print head according to claim 6, wherein the curing device:
   a. is configured for curing the at least one deposited droplet and/or the optical structure depending on the measured geometric and/or optical parameters; and/or
   b. comprises at least two UV-LEDs emitting light of different wavelength ranges, wherein the at least two UV-LEDs are controlled depending on the measured geometric and/or optical parameters.

8. An upgrade kit for a conventional inkjet printer for printing optical structures on a substrate comprising a print head according to claim 1, wherein the print head is adapted to replace a conventional print head of the conventional inkjet printer.

9. A printer comprising a print head according to claim 1.

10. A method for printing optical structures on a substrate by using a print head, comprising steps of providing the substrate and ejecting at least one droplet of a printing ink towards the substrate in order to build up the optical structure,
    wherein a further step of contactless measuring at least one physical parameter of the at least one deposited droplet is performed in real-time;
    wherein at least one geometric parameter of the at least one deposited droplet is measured in the further step; and
    wherein ultrasonic measurements, optical interference measurements and/or optical triangulation measurements are performed in the further step; and wherein the printhead is configured for ejecting further droplets of printing ink in dependence upon the measured at least one physical parameter and the at least one geometric parameter.

11. The method according to claim 10, wherein the contactless measuring in real-time of the at least one physical parameter is performed in the further step in such a manner that the at least one physical parameter is measured before and/or during a further droplet of printing ink is deposited.

12. The method, according to claim 10, wherein:
    a. thickness and/or a surface contour of a layer of deposited droplets is determined in the further step;
    b. an optical parameter of the at least one deposited droplet is determined in the further step, wherein the optical parameter is a grade of transmission, a grade of reflection and/or a coloring of a layer of deposited droplets;
    c. further steps of depositing droplets of printing ink on the substrate are performed depending on the at least one physical parameter, wherein the further steps determine a printing time, a kind of printing ink, an ejection direction of the droplet, a position of the deposited droplet on the substrate, a quantity of ejected printing ink, sizes of the droplets, a number of further droplets, depending on the at least one physical parameter; and
    d. layer thickness measurements and/or distance measurements are performed in the further step.

13. The method according to claim 10, wherein triangulation measurements are performed in the further step.

14. The method according to claim 13, wherein LASER-triangulation measurements are performed in the further step, wherein a laser spot is projected onto the at least one deposited droplet by a LASER source of the printing head and laser light reflected by the at least one deposited droplet is received by a receiving means, including a CCD-camera of the printing head, and/or wherein the at least one physical parameter of the at least one deposited droplet is calculated by evaluating the position of the laser spot on the at least one deposited droplet and the known distance between the LASER source and the receiving means.

15. The method according to claim 10, wherein the at least one deposited droplet is cured by a curing device, wherein light of different wavelength ranges is emitted by two different light sources; and/or wherein the at least one deposited droplet and/or the optical structure is cured depending on the at least one physical parameter, and wherein power of the curing device is determined depending on the at least one physical parameter and/or a certain light source is used depending on the at least one physical parameter.

16. The method according to claim 10, wherein the method comprises a step of moving and rotating the print head to a certain position relatively to the substrate depending on the at least one physical parameter which has been measured before ejecting a further droplet.

* * * * *

UNITED STATES PATENT AND TRADEMARK OFFICE
CERTIFICATE OF CORRECTION

| | | |
|---|---|---|
| PATENT NO. | : 9,592,690 B2 | Page 1 of 1 |
| APPLICATION NO. | : 13/924974 | |
| DATED | : March 14, 2017 | |
| INVENTOR(S) | : Kurt Blessing et al. | |

It is certified that error appears in the above-identified patent and that said Letters Patent is hereby corrected as shown below:

Column 11, Line 3 In Claim 1: delete "with" and insert --and--

Column 12, Line 3 In Claim 10: delete "and"

Signed and Sealed this
Fourth Day of July, 2017

Joseph Matal
*Performing the Functions and Duties of the*
*Under Secretary of Commerce for Intellectual Property and*
*Director of the United States Patent and Trademark Office*